United States Patent [19]

Maycock et al.

[11] Patent Number: 4,858,741
[45] Date of Patent: Aug. 22, 1989

[54] FRICTION CLUTCH FOR A VEHICLE

[75] Inventors: Ian C. Maycock, Leamington Spa; Robert J. Ball, Bishops Itchington; Denzil J. W. Symonds, Warwick, all of England

[73] Assignee: Automotive Products PLC, Leamington Spa, United Kingdom

[21] Appl. No.: 46,712

[22] Filed: May 7, 1987

[30] Foreign Application Priority Data

May 8, 1986 [GB] United Kingdom ................. 8611221

[51] Int. Cl.⁴ ............................................ F16D 23/14
[52] U.S. Cl. ................................ 192/98; 192/DIG. 1
[58] Field of Search ................ 192/98, DIG. 1, 70.13, 192/110 B

[56] References Cited

U.S. PATENT DOCUMENTS 4,632,237 12/1986 Maycock et al. ............ 192/89 B X
4,648,499 3/1987 Despres et al. ...................... 192/98
4,702,362 10/1987 Banks et al. .......................... 192/98
4,733,762 3/1988 Gay et al. ............................. 192/98
4,733,763 3/1988 Gay et al. ............................. 192/98

FOREIGN PATENT DOCUMENTS 2176262 12/1986 United Kingdom .

Primary Examiner—Rodney H. Bonck
Attorney, Agent, or Firm—Solon B. Kemon

[57] ABSTRACT

The clutch is of the pull type having a detent ring between a first member and a second member, and having a detent release sleeve. On release of the detent ring, the members can be separated with the detent ring and sleeve carried on respective members. The sleeve has a peripheral surface engageable within the ring, the surface having a formation thereon whereby during separation of the members following release of the detent ring, relative movement will take place between the detent release sleeve and the member on which it is carried.

16 Claims, 6 Drawing Sheets

Fig. 6. Fig. 7. Fig. 8.
Fig. 9. Fig. 10.
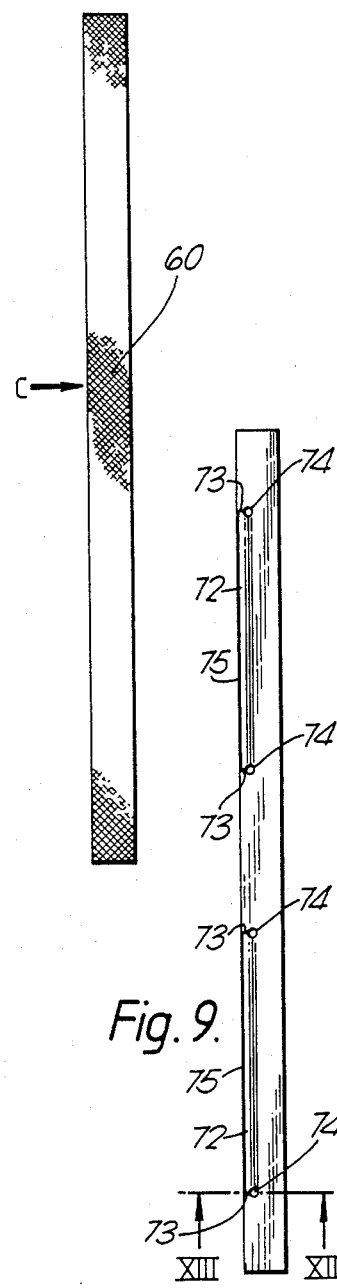
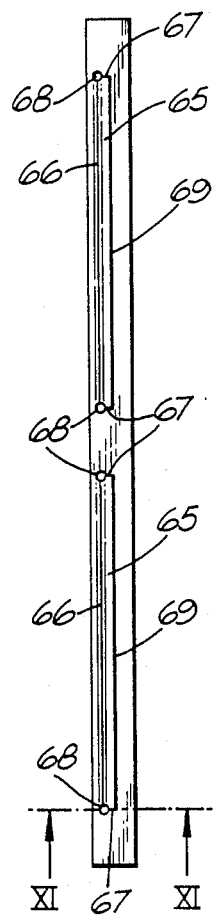
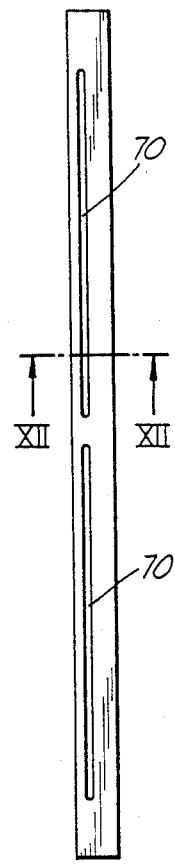
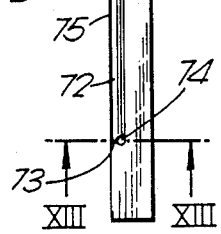
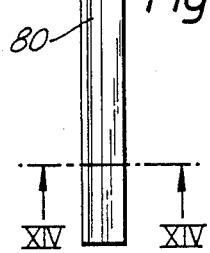

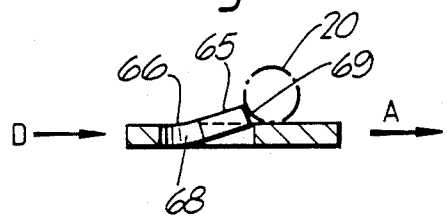
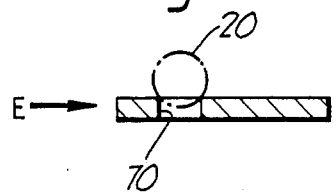
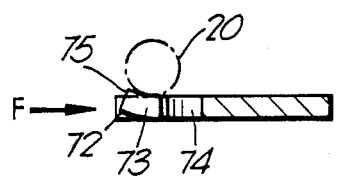
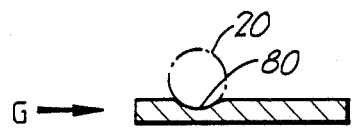
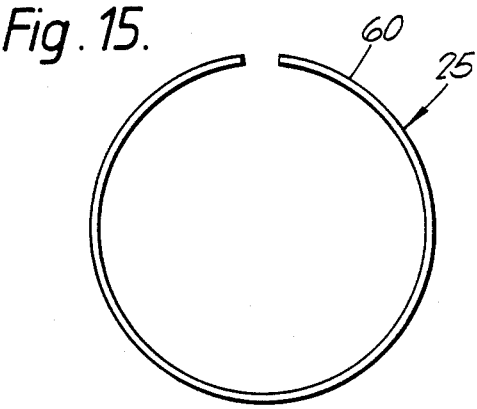

FRICTION CLUTCH FOR A VEHICLE

The invention relates to improvements in a friction clutch for a vehicle and is particularly concerned with improvements in a clutch described in our GB No. 2176262A.

In GB. No. 2176262A there is described a friction clutch for a vehicle which includes a clutch release mechanism comprising a first member, a second member, a detent arranged to locate the first member in one direction relative to the second member whereby a clutch release force subsequently applied to said first member in an opposite direction will be transmitted to said second member to release the clutch and detent release means which enables the detent to be released by urging said first member further in said one direction to said second member so that the first and second members can thereafter be separated, said detent being carried by one of said members and the detent release means being carried by the other of said members whereby on separation of the members following release of the detent said detent and detent release means disengage and remain on their respective members. In certain embodiments the detent is a ring held axially captive on said one member and the detent release means is a sleeve held axially captive on said other member. To release the detent, the sleeve is moved axially to engage the ring and cause the ring to expand so that it will ride on to the peripheral surface (e.g. the outer surface) of the sleeve. Such expansion of the ring moves it clear of a groove in said member thereby enabling the members to be separated. Separation is effected by subsequently moving said other member in the clutch release direction so that a shoulder on that member moves into abutment with the sleeve and finally disengages said other member. However, if foreign matter, such as metal chip, jams the sleeve axially on said other member, it may be possible to move the shoulder into abutment with the sleeve to disengage the members. An object of the present invention is to provide a clutch in which that type of disadvantage is less likely to arise.

According to the invention there is provided a friction clutch release mechanism comprising a first member, a second member, a detent arranged to locate the first member relative to the second member on assembly by moving the first member in one direction relative to the second member whereby a clutch release force subsequently applied to said first member in an opposite direction will be transmitted to said second member to release the clutch, and detent release means having a peripheral surface for engagement with the detent, said detent release means enabling the detent to be released by urging said first member further in said one direction relative to said second member so that the detent release means engages the detent, thereby enabling said first and second members to be separated, said detent being carried by one of said members and the detent release means being carried by the other of said members whereby on separation of the members following release of the detent said detent and detent release means disengage and remain on their respective members, the detent release means having a formation on its peripheral surface which engages the detent during movement of the first member further in said one direction whereby during separation of the members following release of the detent relative movement will take place between the detent release means and said other member.

The relative movement is substantially ensured by use of the formation thereby assisting in overcoming resistance to such relative movement caused by a metal chip.

The formation may comprise a radial deformation on the detent release means.

In certain embodiments, the formation comprises a section material which is pressed partly out of the detent release means. Such a section of the detent release means and may be inclined about an edge of the section. In one embodiment, the section may have a projecting edge which forms part of an edge of the detent release means. A plurality of such sections may be provided.

In another embodiment, the formation comprises an aperture in the detent release means which may take the form of a circumferentially extending slot. If desired a plurality of such slot may be provided.

In a further embodiment, the formation includes a recess, such as a circumferentially extending groove in the detent release means.

The formation may provide a location for the detent on the detent release means during releasing movement whereby on movement of the said other member in said opposite direction, the detent resists axial movement of the detent release means with said other member.

In a yet further embodiment, the formation comprises a roughened area of said peripheral surface. Substantially the whole of said peripheral surface may be roughened.

The detent may comprise a ring and the detent release means may comprise a sleeve.

The invention also includes a friction clutch for a vehicle which includes a clutch release mechanism comprising a first member, a second member, a detent ring arranged to locate the first member relative to the second member on assembly by moving the first member in one direction relative to the second member whereby a clutch release force subsequently applied to said first member in an opposite direction will be transmitted to said second member to release the clutch, and a detent release sleeve having a peripheral surface which includes a formation for engagement with the detent ring, said sleeve enabling the detent ring to be released by urging said first member further in said one direction relative to said second member so that the sleeve engages the detent ring and causes it to move into engagement with said formation on the sleeve, thereby enabling said first and second members to be separated, said detent ring being carried by the other of said members whereby on separation of the members following release of the detent said detent and detent release sleeve disengage and remain on their respective members.

A friction clutch in accordance with the invention will now be described by way of example with reference to the accompanying drawings in which:

FIGS. 6 to 10 are developments of five respective sleeves formed from metal strip.

FIG. 11 to 14 are cross-sections of the developments in FIGS. 7 to 10 on the lines XI—XI, XII—XII, XIII—XIII and XIV—XIV respectively in FIGS. 7 to 10, drawn to a larger scale, and FIGS. 15 to 19 are end views of sleeves formed from the strips shown in FIGS. 6 to 14 looking in the direction of arrow C and D to G in FIGS. 6 and 11 respectively.

Figure 1:
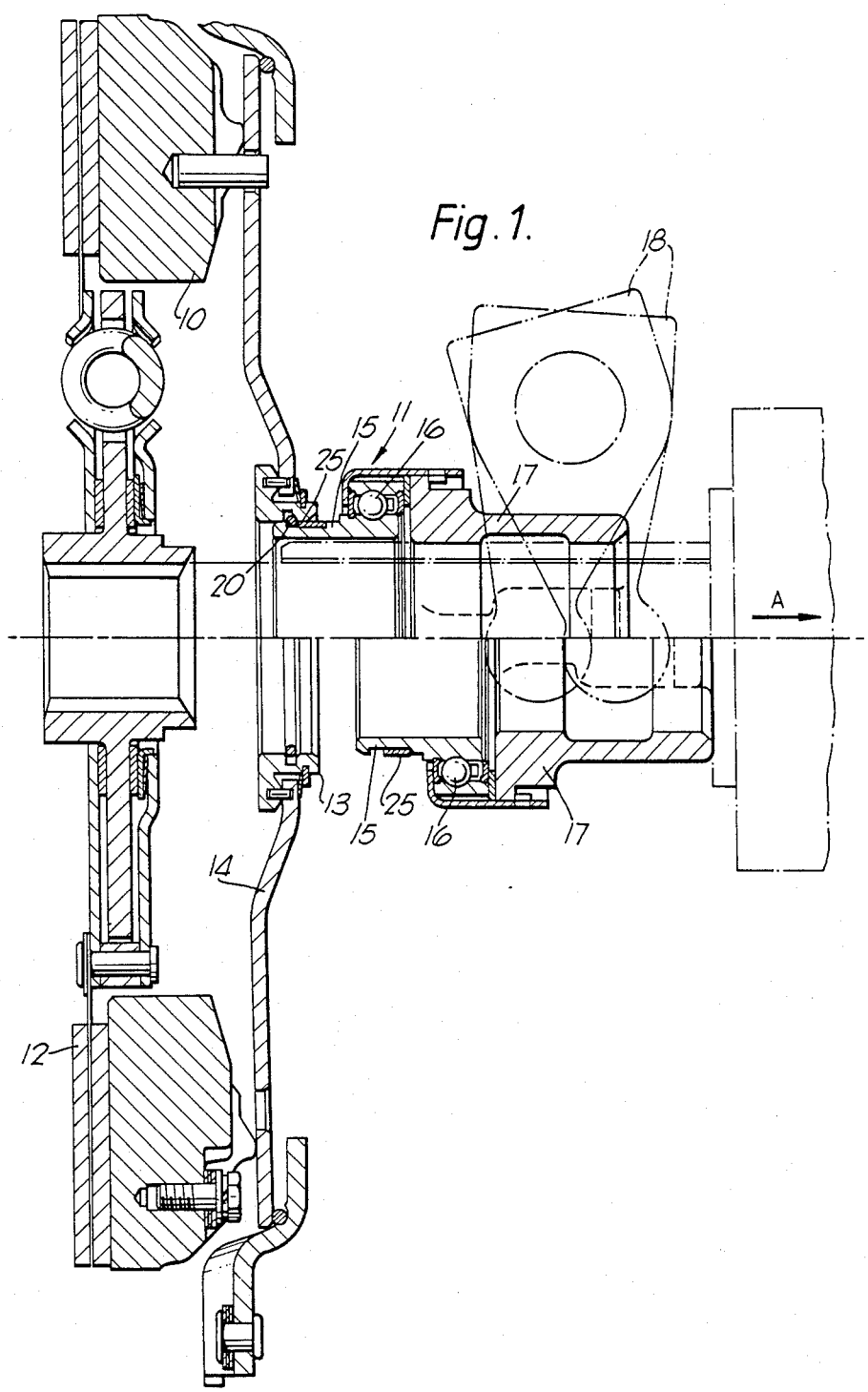
FIG. 1 is a cross-section through a friction clutch in accordance with the invention, FIG. 2 to 5 drawn to a larger scale show the way in which a clutch release mechanism of the clutch of FIG. 1 can be assembled and dis-assembled.

In FIG. 1 there is shown a friction clutch in which a clutch pressure plate 10 is retracted by a clutch release mechanism 11 to release a clutch driven plate 12. Clutch release is effected by applying a force in direction A to a fulcrum plate or hub 13 of a clutch spring 14 through a short hollow shaft 15, clutch release bearing 16 and a pull member 17. The releasing force is applied by means of a release fork 18 which engages the pull member 17. The lower half of FIG. 1 shows the position of shaft 15 release bearing 16, pull member 17 and fork 18 in the clutch release position.

Figure 2:
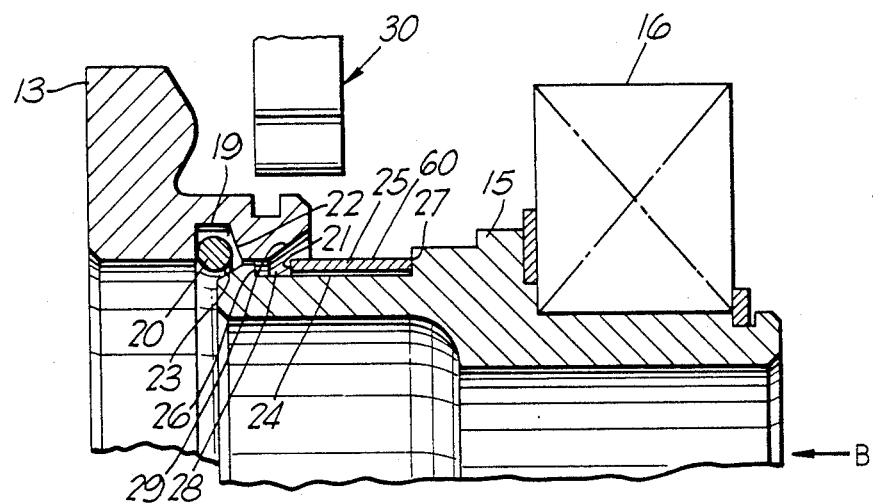

Referring now to FIGS. 2 to 5 the spring hub 13 (constituting the aforesaid second member) has an internal peripheral groove 19 which locates a detent 20 in the form of a resilient split ring. The outer diameter of the split ring is less than the diameter of groove 19 to allow the ring to be expanded. The right hand side 22 of groove 19 as viewed in FIG. 2 is of frusto conical form. The shaft 15 (constituting the aforesaid first member) has a frustom conical left hand leading surface 23 and is formed with a wide external groove 24. A split cylindrical sleeve 25 of the kind shown in FIGS. 6 and 15 locates in the groove 24 and is freely slidable axially between end shoulders 26,27 of the groove, the shoulders holding the sleeve captive on the shaft 15. The sleeve 25 is formed from a flat strip of steel as in FIG. 6 which has a surface 60 machined to give a roughened finish, e.g. file-like. The strip is then bent into the sleeve form shown in FIG. 15 so that the roughened surface 60 forms the outer peripheral surface of the sleeve.

The left hand end of the sleeve 25 is defined by a radial surface 21. Where the sleeve 25 abuts shoulder 27 a recess 28 is defined between shoulder 26 and the left hand end of sleeve 25.

Figure 3:
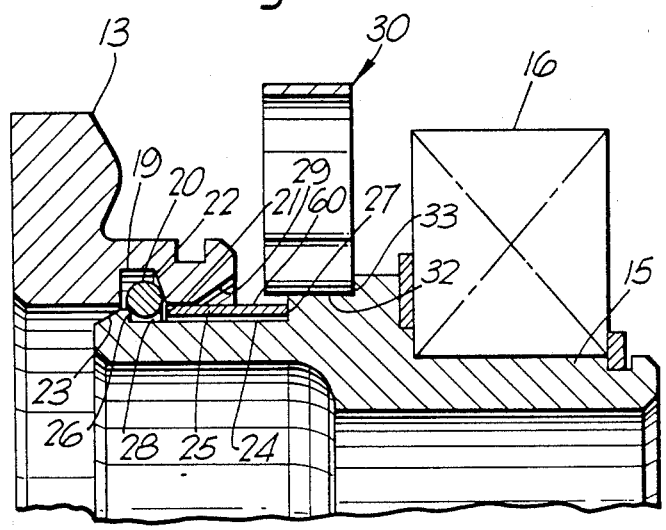

To assemble the clutch release mechanism 11, the shaft 15 along with bearing 16 thereon moved in direction of arrow B (FIG. 2) so that the frusto conical surface 23 abuts the split detent ring 20 causing it to expand into the groove 19 and ride over the surface 23 until it eventually snaps into the recess 28 (FIG. 3). In that position the ring is preferably in a non-expanded condition to minimise stress in the ring. Clutch release forces can then be applied to the hub 13 by applying a force to shaft 15 in the direction of arrow A, the frusto conical surface 22 tending to urge the ring towards the bottom of groove 24 thereby ensuring that the detent ring cannot expand out of engagement with the recess 28.

Figure 4:
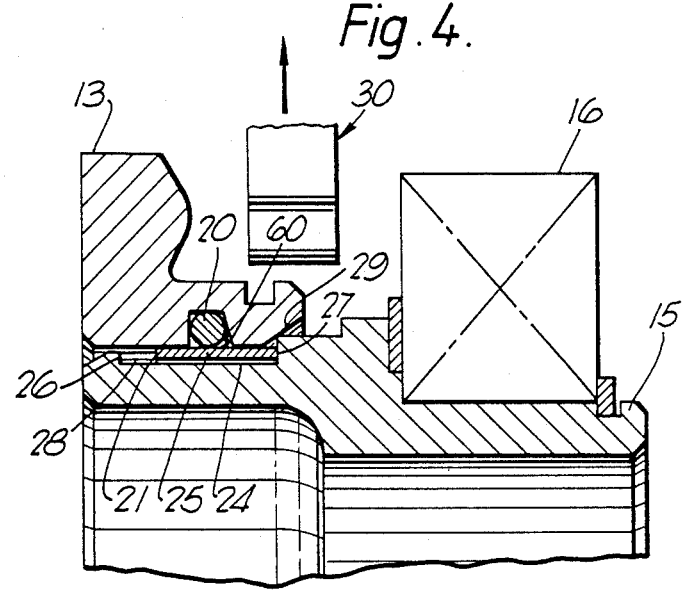
Figure 5:
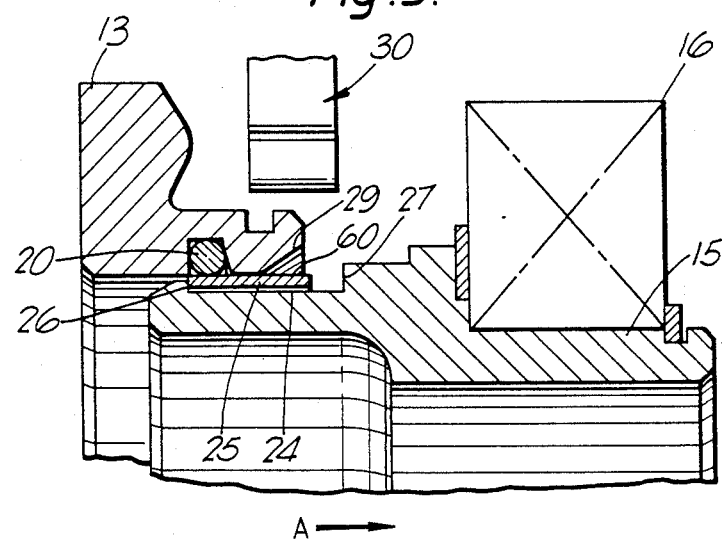

To disassemble the release mechanism, a force in the direction of arrow B is applied to the shaft 15 which urges the left hand end of sleeve 25 against the detent ring 20 thereby expanding the ring out of recess 28 and into the groove 19. continued movement of the shaft 15 indirection B causes the outer surface of the sleeve to move within the ring 19 so that the latter resiliently grips the roughened outer periphery 60 of the sleeve (FIG. 4). The shaft 15 can then be moved in direction A to separate the spring hub 13 and shaft 15 to complete disassembly. On doing that the shaft 15 moves relative to the sleeve 25 until the shoulder 26 abuts the left-hand end 21 of the sleeve as in FIG. 5. Further movement of the shaft in direction A causes the sleeve to slide from within the ring 20 until the latter disengages the sleeve 25 and finally rides down the frusto conical end surface 23 to resume the FIG. 2 condition.

The roughened surface 60 provides increased resistance to relative axial movement between the ring 20 and the sleeve 25. If some foreign matter such as a metal chip becomes jammed between the inner periphery of the sleeve 25 and the bottom groove 24 then, without the roughening 60, the resistance to movement of the shaft 15 relative to the sleeve 25 may be greater than the resistance to movement of the sleeve 25 relative to the ring 20. In such a case, movement from the FIG. 4 position towards the FIG. 5 position would simply result in the shaft pulling the sleeve in direction A relative to the ring 20 until the latter snapped back into recess 28. Roughening the surface 60 reduces the likelihood of that occurring.

Instead of using a sleeve 25 having a roughened surface, various other types of sleeves as shown in FIGS. 16 to 19 could be used, developments of which are shown in FIGS. 7 to 14.

Figure 16:
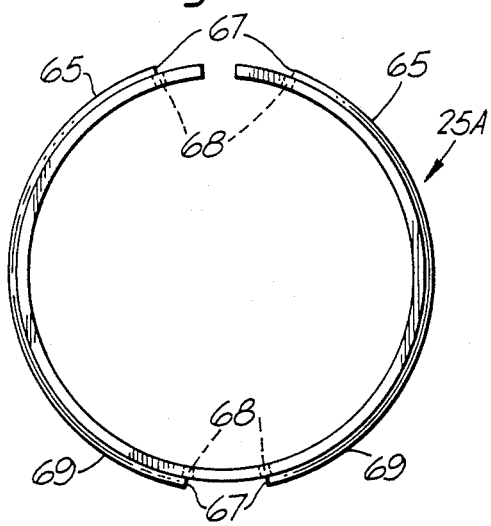

In FIGS. 7, 11 and 16, the strip used for form a sleeve 25a has two elongate sections 65 which are pressed partly out of the plane of the strip. The sections are bent about edges 66 thereof. Each section has two transverse end edges 67 which terminate at stress relieving apertures 68. When the strip is bent to form the sleeve, the sections 65 extend circumferentaiily and form radially outwardly extending projections having outer edges 69. The sleeve is located in groove 24 on the shaft 15 so that in order to reach the FIG. 4 position, the ring must ride over the edges 69 by pressing sections 65 inwardly before finally snapping behind the projection as shown in FIG. 11. If the sleeve is jammed in the groove 24, the steps present by edges 69 resist movement of the sleeve in direction A relative to the ring 20 which will assist in overcoming the jamming of the sleeve in the groove. Once the sleeve engages shoulder 26, sufficient load can be applied in direction a to the shaft 15 to cause the ring to press the sections 65 inwardly until it can ride over eges 60 and finally disengage the sleeve and shaft. The withdrawal of shaft 15 from within the hub 13 will cause the right hand side 22 of groove 19 to press the sections 65 inwardly to enable the sleeve to clear the hub.

Figure 17:
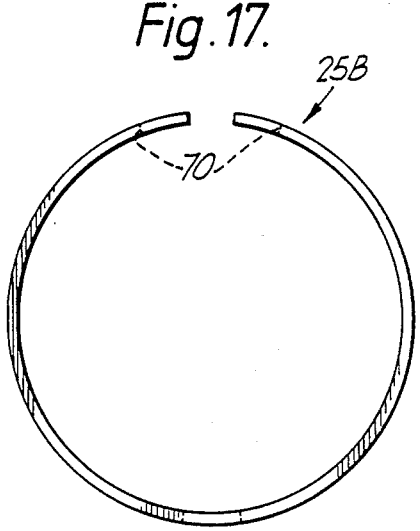
Figure 18:
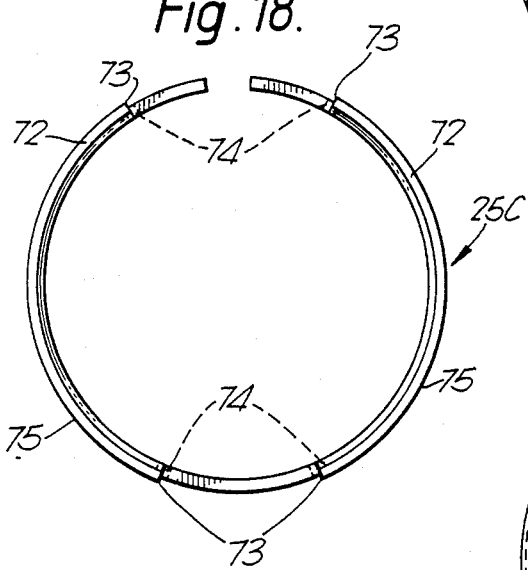

In FIGS. 8, 12 & 17 the strip is formed with two elongate apertures 70 into which the ring will snap when a sleeve 25B formed from the strip is in the FIG. 4 position. The location of the ring in that way will again resist movement of the sleeve in direction A relative to the ring 20. In FIGS. 9, 13 and 18 two elongate edge sections 72 are bent out of the plane of the strip. The sections 72 have end edges 73 which terminate at stress-relieving apertures 74. When the strip is bent to form a sleeve 25C, the sections 72 extend circumferentially and form radially outwardly extending projections having outer edges 75. In order to reach the FIG. 4 position the ring 20 must ride over the edges 75 by pressing sections 72 inwardly before snapping behind the projections as shown in FIG. 13. The sections 72 then act in similar manner to sections 65 in FIG. 16.

Figure 19:
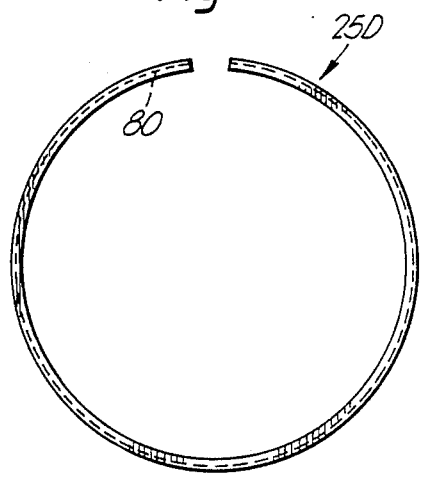

In FIGS. 10, 14 and 19 the strip is formed with an elongate groove 80 which locates the ring 20 in the FIG. 4 position when bent into the form of a sleeve 25D and acts in a similar manner to the apertures 70 in FIG. 8.

It is envisaged that other formations could be incorporated in strips, i.e. a strip could be radially deformed to provide a radially outward projection without actually pressing out parts of section of the strip in the manner of FIGS. 7 and 9.

It will be appreciated that both the detent ring 20 and the sleeves 25-25D are retained on their associated members 13,15 after disassembly. The hub 13 has a frusto conical lead-ion surface 29 to aid assembly.

To prevent accidental release, a spring clip 30 is located around a cylindrical outer surface portion 32 of the shaft 15 in abutment with a shoulder 33 as described in G.B. No. 2176262A to limit movement of shaft 15 in direction B. When it is desired to release the detent ring, the clip 30 is first removed using a suitable tool.

We claim:

1. A friction clutch for a vehicle which includes a clutch release mechanism comprising a first member, a second member, a detent arranged to locate the first member relative to the second member on assembly by moving the first member in one direction relative to the second member whereby a clutch release force subsequently applied to said first member in an opposite direction will be transmitted to said second member to release the clutch, and detent release means having a peripheral surface for engagement with the detent, said detent release means enabling the detent to be released by urging said first member further in said one direction relative to said second member so that the detent release means engages the detent, thereby enabling said first and second members to be separated, said detent being carried by one of said members and the detent release means being carried by the other of said members whereby on separation of the members following release of the detent said detent and detent release means disengage and remain on their respective members, the detent release means having a radial deformation on its peripheral surface which engages the detent during movement of the first member further in said one direction whereby during separation of the members following release of the detent relative movement will take place between the detent release means and said other member.

2. A friction clutch according to Claim 11 in which the detent release means is a sleeve.

3. A friction clutch according to claim 1 in which the formation on the detent release means comprises a projection on its peripheral surface.

4. A friction clutch according to claim 3 in which the projection comprises a section of material which is pressed partly out of the detent release means.

5. A friction clutch according to claim 4 in which said section extends circumferentially of the detent release means and is inclined about an edge of the section.

6. A friction clutch according to claim 4 in which said section has a projecting edge which defines part of an edge of the detent release means.

7. A friction clutch according to claim 4 in which a plurality of said sections is provided.

8. A friction clutch according to claim 1 in which the formation comprises at least one recess in the detent release means.

9. A friction clutch according to claim 8 in which said recess is a circumferentially extending groove in the detent release means.

10. A friction clutch according to claim 1 in which the formation comprises an aperture in the detent release means.

11. A friction clutch according to claim 10 in which the aperture comprises a circumferentially extending slot.

12. A friction clutch according to claim 11 in which a plurality of circumferentially extending slots is provided.

13. A friction clutch according to claim 1 in which the formation provides a location for the detent on the detent release means whereby on movement of the said other member in said opposite direction, the detent resists movement of the detent release means with said other other.

14. A friction clutch according to claim 1 in which the formation comprises a roughened area of said peripheral surface of the detent release means.

15. A friction clutch according to claim 14 in which substantially the entire peripheral surface of the detent release means is roughened.

16. A friction clutch according to claim 11 in which the detent is a ring.

* * * * *